United States Patent [19]

Sanders

[11] Patent Number: 5,333,886
[45] Date of Patent: Aug. 2, 1994

[54] HAND TRUCK FOR MAGNETIC BASE TOOLS

[76] Inventor: David Sanders, 141 Buena Vista Dr., Brevard, N.C. 28712

[21] Appl. No.: 85,584

[22] Filed: Jun. 30, 1993

[51] Int. Cl.$^5$ .............................................. B62B 1/06
[52] U.S. Cl. .............................. 280/47.28; 280/47.26; 280/652
[58] Field of Search .................. 280/651, 47.17, 47.24, 280/47.26, 47.28, 652; 408/238, 239 R

[56] References Cited

U.S. PATENT DOCUMENTS

| | | | |
|---|---|---|---|
| 4,179,132 | 12/1979 | Rich | 280/47.26 |
| 4,448,434 | 5/1984 | Anderson | 280/47.28 |
| 4,625,949 | 12/1988 | Walker | 280/47.26 |

*Primary Examiner*—Richard M. Camby
*Attorney, Agent, or Firm*—Michael E. Smith

[57] ABSTRACT

A hand truck adapted for transporting a magnetic base drill press. The invention consists of a two-wheeled cart with a lower horizontal platform having a vertical ridge shaped to conform to the base of a commonly used magnetic base drill press. The invention also has an adjustable locking device adapted to secure the power head of the drill to the hand truck so that it may be easily and safely moved from place to place.

3 Claims, 4 Drawing Sheets

HAND TRUCK FOR MAGNETIC BASE TOOLS

BACKGROUND OF THE INVENTION

1. Field of the Invention

The present invention relates to wheeled devices for transporting moderately heavy electrical tools from place to place. The invention uses a type of cart known as a hand truck, which is common in the art. The generic hand truck consists of a frame with a horizontal lower platform which rests on the floor when the hand truck is fully upright, two wheels, one on either side of the platform, and a vertical or near-vertical portion of the frame, against which the load rests. At the upper portion of the frame, one or two handles are shaped to allow the operator to tilt, push and guide the hand truck. A load is placed on the lower horizontal platform, and the operator then tilts the hand truck to raise the forward portion of the platform from the floor, and steers the hand truck with its load to the desired location. The present invention relates to the design of the lower horizontal platform and an additional locking device adapted to secure a specific load.

In certain factories, and specifically in fiber and fabric plants, it is common to need to make repairs to large machines. In order to do so, technicians often need specialized repair tools at the repair site. One of the more common tools is a magnetic base portable drill press. This tool stands 1 to 1½ meters in height, and weighs approximately 35 kilograms. There are two centers of mass, one in the base and the other larger mass in the power head, which is as much as a meter above the base. In many factories, it is carded by hand from its storage site to the repair location. This is awkward, dangerous and onerous. On occasion, hand trucks are used to transport the tool, but because of its shape and the location of the mass, it is difficult to retain the drill on a simple flat platform. The operator transporting the drill must hold it in place by hand or tie it on with bits of rope, wire or strapping. The present invention overcomes this difficulty by providing an adjustable locking device which secures the heavy power head portion of the drill to the truck.

A hand truck adapted to accept the drill and secure it to the hand truck with a quick and simple locking device will be readily accepted by the industry.

2. Background of the Art

There are a number of devices on the market for transporting moderate to heavy loads by hand. None of these are adapted for the specific load intended for the instant invention. The basic design of the two-wheeled hand truck has been known in the art for centuries. Many variations on the hand truck have been made especially adapted for retaining and transporting certain items. For example, U.S. Pat. No. 4,625,949 to Walker discloses a hand truck of the common type adapted to transport oxygen and fuel tank cylinders and associated tools and equipment used in welding. In this invention, the tanks are secured to a base and the upright frame with locking devices. The present invention uses a different locking device adapted to the design and shape of the drill intended to be transported, and adds a device on the lower horizontal platform into which the base of the drill is placed for additional security. U.S. Pat. No. 4,753,445 to Ferrare shows a hand truck for transporting a single pressurized gas cylinder, which includes two bands shaped to receive a cylinder. The present invention employs a solid base with a device to receive the base of the drill. Other patents disclose variations on the shape and construction of the basic hand truck.

SUMMARY OF THE INVENTION

I have developed and invented a new and improved means of transporting certain items of electrical machine tools. The invention is simple, sturdy, and economically constructed from readily available materials, yet provides a solution to a recurring problem in transporting specific machine tools.

In a preferred form of the invention, the frame includes two outer vertical uprights and a central upright, which rise from a horizontal platform adapted to receive the base of the type of magnetic base drill intended to be carded. The outer vertical uprights curve inward to join the central upright and form a single upright handle for controlling and propelling the device.

An axle shaft is disposed at the rear of the horizontal platform, with a suitably sized wheel at either end of the axle shaft. The axle shaft is attached at an appropriate height such that when the hand truck is tilted into a comfortable balanced position, the horizontal platform is raised from the floor surface, and the device is balanced on the two wheels, without imposing an excessive load on the person operating the device.

The vertical uprights are joined by cross braces, including the axle shaft, which acts as a lower cross brace, and the conjunction of the three vertical uprights to form a handle, which acts as an upper cross brace. A central cross brace is disposed at a height which is appropriate to support a retaining mechanism to secure the magnetic base drill in position during transport.

The central cross brace includes a slot into which is mounted a securing frame. The slot allows the securing frame to be moved laterally into position to support the head of the magnetic base drill. The range of adjustment permitted by the slot allows the hand truck to be adapted for transporting various sizes and models of drills.

The securing frame is mounted perpendicularly to the plane of the vertical uprights by an L-shaped bracket, which is drilled to permit a bolt to secure it to the slot in the central cross brace. The securing frame is a U-shaped metal bracket, with an interior opening sufficient to receive the head of the drill, and an upper locking arm, attached to the inner arm of the securing frame by a bolt or pin which allows the locking arm to raise to receive the head of the drill, and lower to lock the drill into place. The distal end of the locking arm is secured to the outer arm of the securing frame by another bolt or pin.

A preferred embodiment of the invention also includes a lifting eye, allowing the hand truck, with drill attached, to be raised and moved by an overhead crane, which is often found in fabric and paper plants. It also includes a metal box, with securing lid, of an appropriate size for containing drill bits, power cords, and other necessary accessories for the drill.

DETAILED DESCRIPTION OF THE INVENTION

Many variations and modifications of the embodiments of the invention will be apparent to those skilled in the art without departing from the scope of the invention, which is defined in the claims appended hereto.

Figure 1:
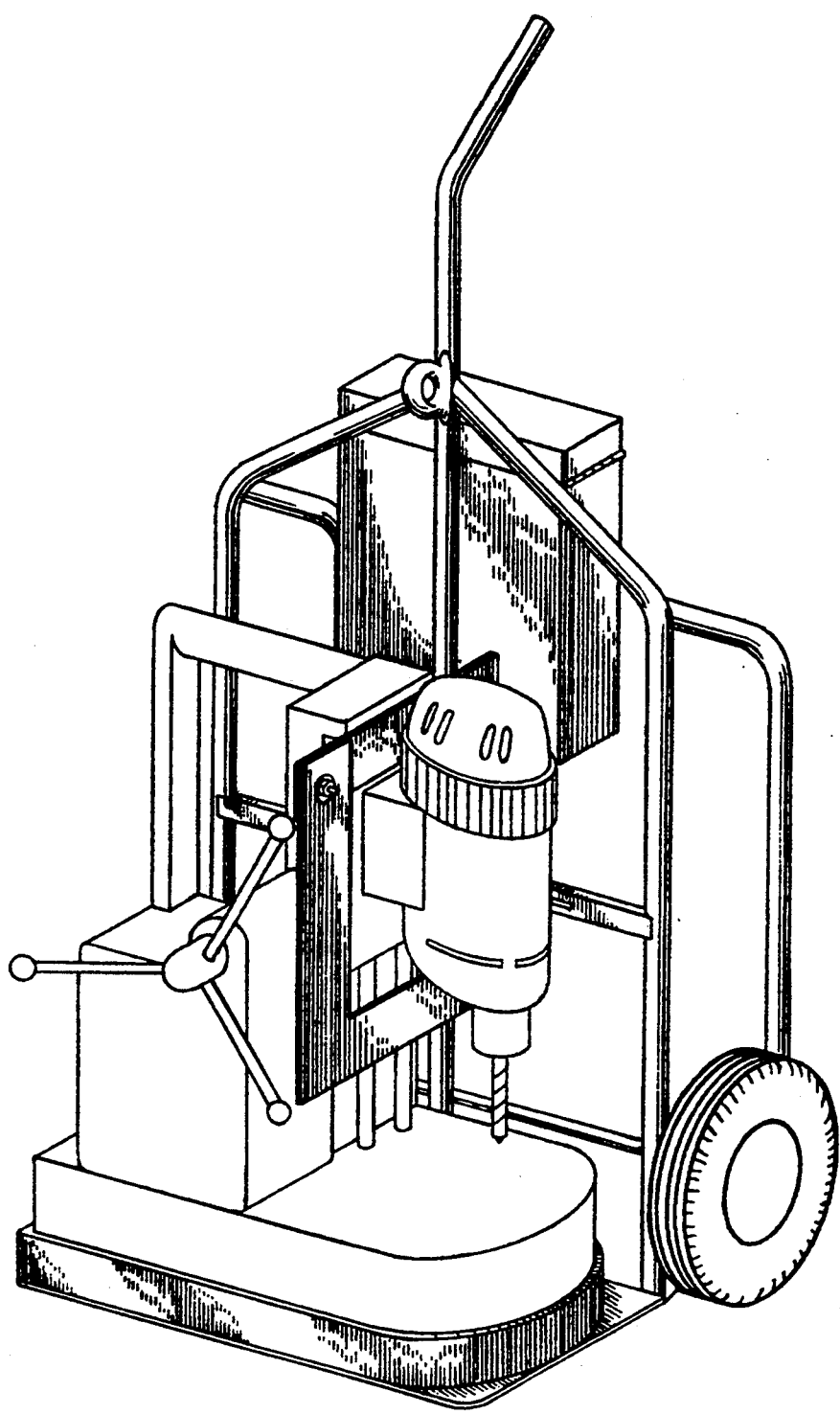
FIG. 1 is a pictorial representation of a preferred embodiment of the invention in perspective view, showing a typical magnetic base drill in place.
Figure 2:
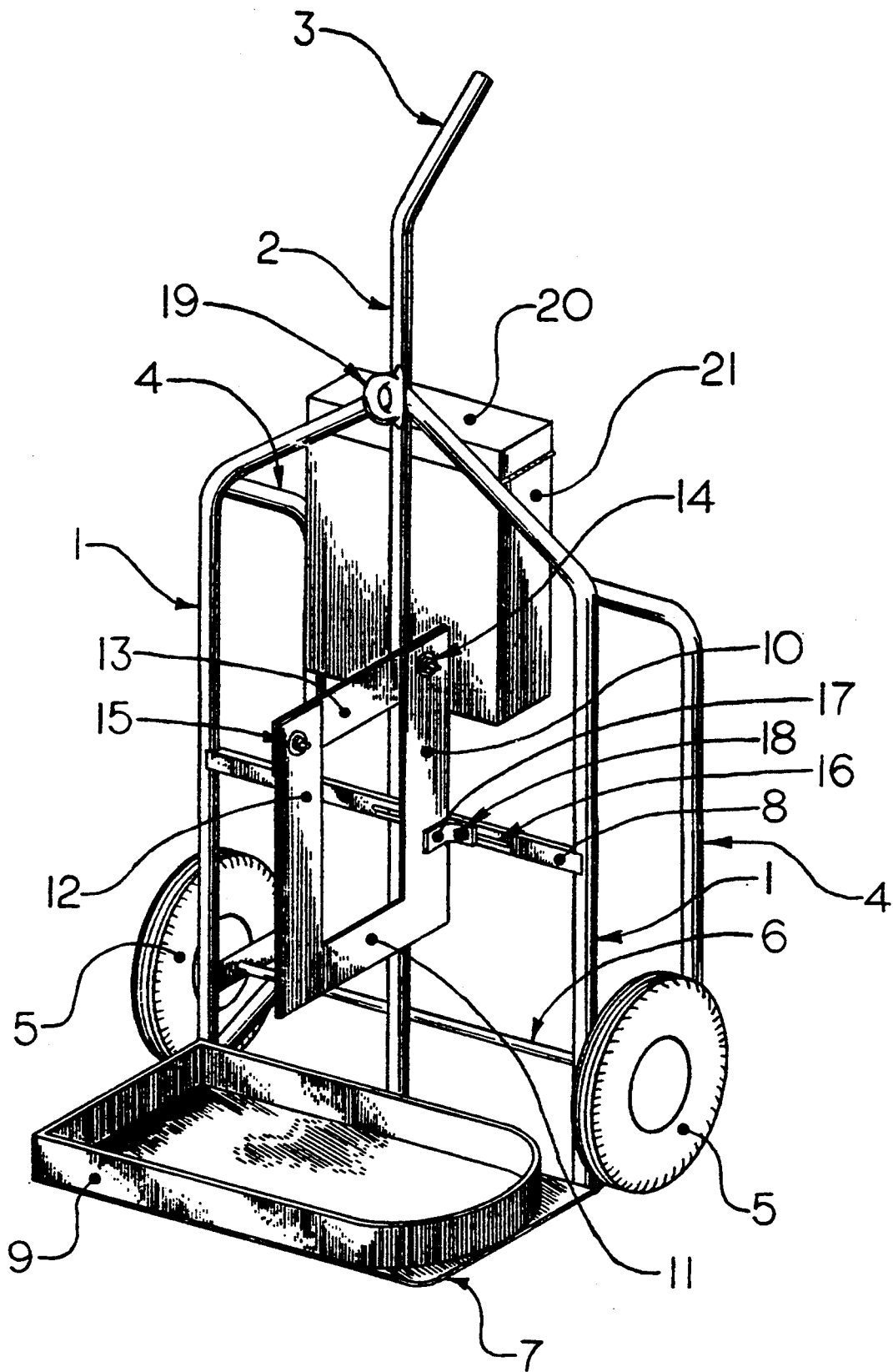
FIG. 2 is a drawing of the invention without the drill in place.

Referring now to the figures, FIG. 1 shows a perspective view of the invention with a typical magnetic base drill secured in position. FIG. 2 shows the cart for transporting magnetic base drills, comprising two outer vertical uprights 1 and a central vertical upright 2, the upper extension of which forms a handle 3. In this preferred form of the invention, additional rear braces 4 provide rigidity and allow the device to be laid flat for specific uses. Two wheels 5 are disposed at the extreme ends of axle shaft 6. A horizontal platform 7 is provided with raised ridge 9 shaped to receive the base of the drill for which this device is intended. Central cross brace 8 supports securing frame 10 consisting of a lower section 11 and two vertical arms 12. The drill is secured by upper retaining arm 13, which is attached to rear vertical arm 12 by bolt or pin 14. When the drill is secured in place, upper retaining arm 13 is secured to front vertical arm 12 by bolt 15. Securing frame 10 is attached to central brace 8 by bracket 17 welded to frame 10 and attached through slot 16 by bolt 18. This embodiment of the invention is supplied with lifting eye 19, and with accessory box 21 with lid 20.

Figure 3:
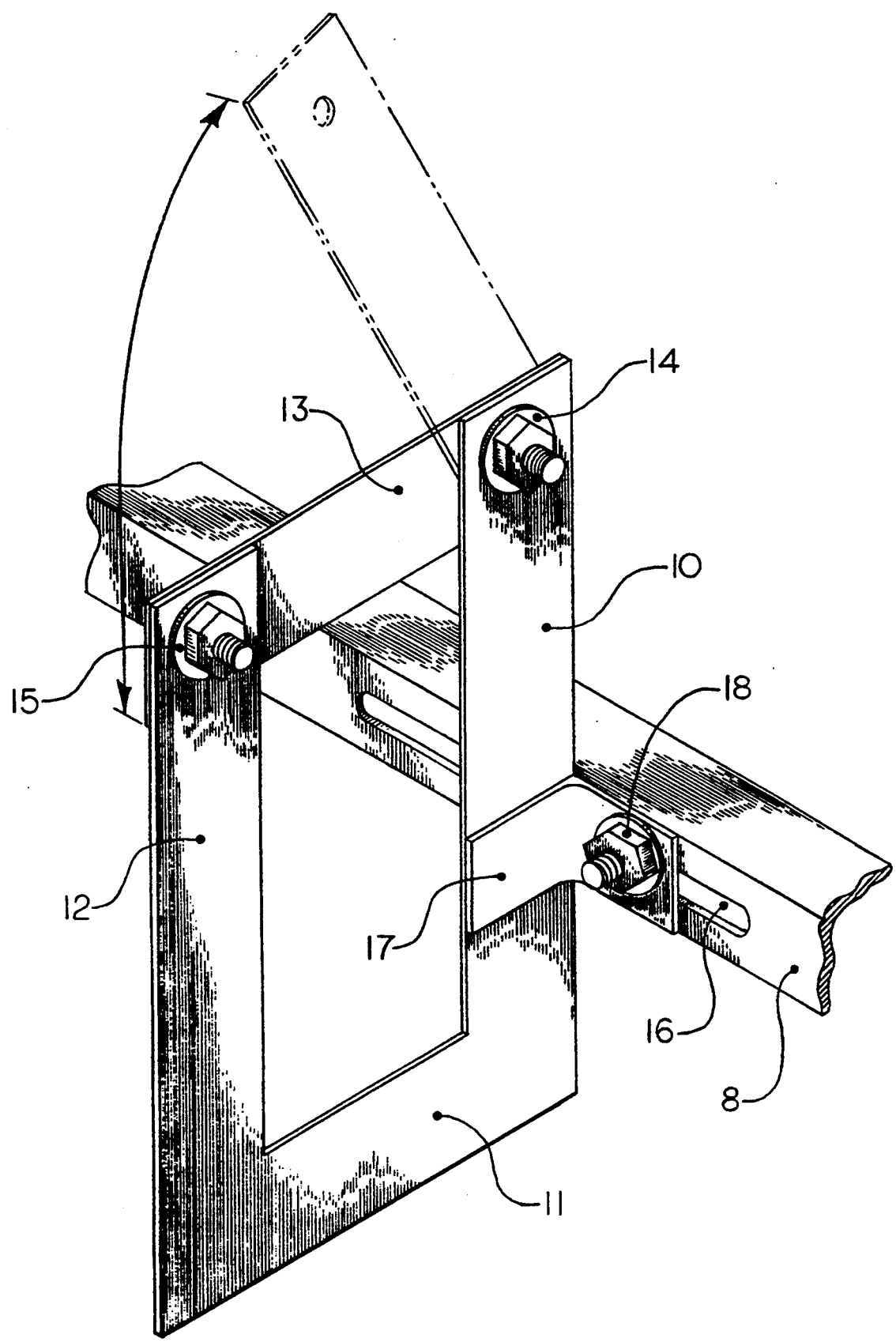
FIG. 3 is an enlarged detail of the securing frame.

FIG. 3 is an enlarged detail showing securing frame 10. In this Figure, the construction of securing frame 10, with upper retaining arm 13 and its attachment points 14 and 15, and the means of attaching securing frame 10 to cross brace 8 are apparent.

Figure 4:
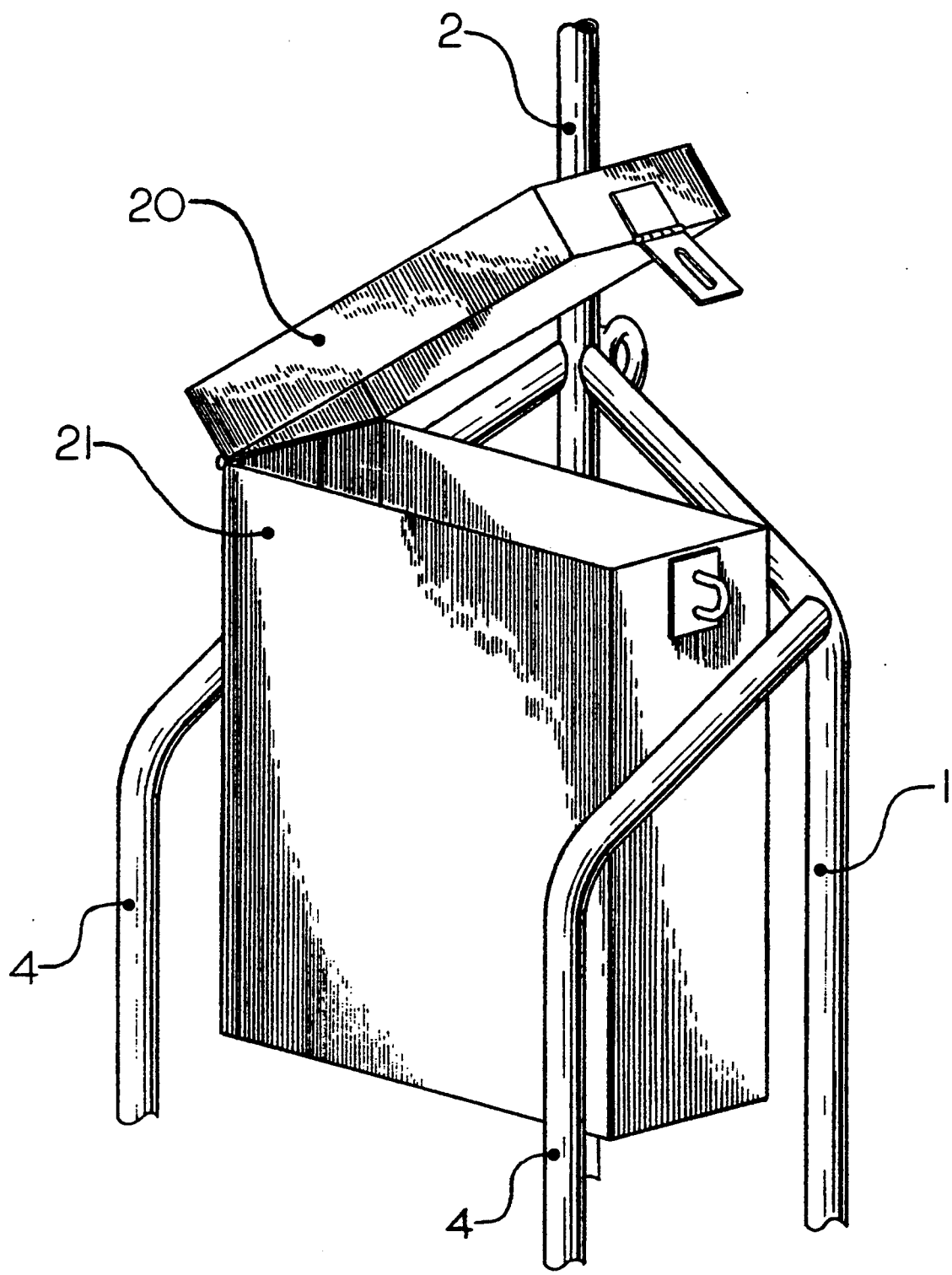
FIG. 4 is an enlarged detail of the accessory box.

FIG. 4 shows accessory box 21 with lid 20 open, attached to outer vertical uprights 1 and central vertical upright 2, with a detail of the rear braces 4.

The embodiments described above are merely descriptive of its principles and are not to limit the scope of the invention set out in the following claims.

What is claimed is:

1. A hand truck for transporting portable magnetic base drill presses or the like, comprising
   a handle and a generally vertically oriented frame composed of three vertical uprights joined together at the upper portion to form a handle portion;
   a generally horizontally oriented axle mounted to the lower portion of said frame, having two wheels rotably mounted to the axle;
   a lower platform generally perpendicular to said vertical frame extending forward of said frame;
   a vertical ridge disposed on said lower platform shaped to receive a specified magnetic base drill;
   a central cross brace provided with a horizontal slot;
   a generally U shaped securing frame, comprising a lower arm, two vertical arms, and a movable upper retaining arm rotably attached to the upper portion of one of said vertical arms by a bolt or pin, and adapted to be attached at the outer end of said movable upper retaining arm to the upper portion of the other vertical arm by a removable bolt;
   said U shaped securing frame having affixed thereto an L shaped bracket, the unattached arm of which is pierced to receive a bolt, which bolt is the appropriate size to secure said securing frame to said central cross brace through said slot;

2. A hand truck as set forth in claim 1, having a lifting eye affixed to the conjunction of the three vertical uprights;

3. A hand truck as set forth in claim 1, having an accessory box mounted at the conjunction of the three vertical uprights.

* * * * *